US005628854A

United States Patent [19]

Ball

[11] Patent Number: 5,628,854
[45] Date of Patent: May 13, 1997

[54] LETTER MOVER

[76] Inventor: Benton C. Ball, 401 N. Antler St., Gladwin, Mich. 48624

[21] Appl. No.: 417,812
[22] Filed: Apr. 6, 1995
[51] Int. Cl.[6] ........ B32B 35/00
[52] U.S. Cl. ........ 156/230; 156/344; 156/579; 156/584; 248/683; 294/168; 40/595; 40/618; 40/622
[58] Field of Search ........ 156/344, 584, 156/579, 230; 271/33; 294/1.1, 167, 168; 40/618, 622, 657, 595, 597; 248/683; 276/37

[56] References Cited

U.S. PATENT DOCUMENTS

| | | | |
|---|---|---|---|
| 517,295 | 3/1894 | Pulling | 271/33 |
| 1,049,965 | 1/1913 | Zeitz | 276/37 |
| 1,570,217 | 1/1926 | Green | 276/37 |
| 3,118,680 | 1/1964 | Lynch | 276/37 |
| 3,391,938 | 7/1968 | Lynch | 276/37 |
| 3,974,539 | 8/1976 | Barouh et al. | 294/1.1 |
| 4,640,539 | 2/1987 | Le Porte | 294/1.1 X |
| 4,653,789 | 3/1987 | McWilliams et al. | 294/1.1 |
| 4,887,858 | 12/1989 | Gazzarrini | 294/1.1 |
| 5,289,614 | 3/1994 | Hartz | 294/1.1 X |
| 5,470,116 | 11/1995 | DeWoskin | 294/1.1 |

*Primary Examiner*—Mark A. Osele

[57] ABSTRACT

A device for the manipulation of letters on a changeable letterboard. A slide, with a tacky frontal adhesive face for temporary attachment of letters to be moved, is withdrawn into a closely mating outer case, the case stripping the letters from the adhesive face. An internal spring maintains the tacky frontal face in a normally exposed position in relation to the case. A gripping, squeezing area is provided to allow the actuation of movement of the slide into the case. The tacky adhesive face of the device is placed against letters to be moved, the device with letters temporarily adhesively attached is withdrawn from the letterboard and moved to a new location, the gripping area is squeezed, actuating the withdrawal of the adhesive face into the case, the front of the case strips the letters from the adhesive. Letters being moved as a group by the device will maintain their relative positions while being relocated.

6 Claims, 2 Drawing Sheets

LETTER MOVER

BACKGROUND-FIELD OF INVENTION

This invention relates to a device for the manipulation of letters on a changeable letterboard, specifically a device for adhesively gripping a letter or group of letters for removal from the changeable letterboard and for mechanically stripping the letters from the adhesive when those letters are positioned in a new location or deposited elsewhere.

BACKGROUND-DESCRIPTION OF PRIOR ART

Before the time of the above described invention, no device had been used to grip, move, and mechanically release a group of letters while simultaneously maintaining their relative position to each other. A person would use fingers, fingernails or a thin object to remove the individual letters from the letterboard, and finger pressure to individually place them in a new location. This method was both tedious and time consuming. The new device facilitates manipulation of letters on a changeable letterboard providing ease of use, and reducing time consumed for labor.

SUMMARY AND OBJECTS OF THE INVENTION

The invention relates to the manipulation of letters on a changeable letterboard. A typical changeable letterboard would have a corrugated felt background. The letters to be manipulated have previously been placed in position on the letterboard. The invention uses a tacky, malleable, self-renewing adhesive to grip a letter or group of letters for removal from the letterboard, and a means to strip those letters from the adhesive when those letters are positioned in a new location on the letterboard or deposited elsewhere. The invention keeps the letters in relative alignment for purposes of removal or replacement.

Accordingly, several objects and advantages of my invention are that this device is particularly suitable for moving a group of letters that form a name or a word. It can speed up the revision of an alphabetical column of names by moving a whole group of letters at one time instead of the previous method of one letter at a time by hand. A changeable letterboard used for a menu board can be quickly rearranged by moving a group of letters as similarly stated above.

A further object of the invention is to provide a device for adhesively gripping a letter or a group of letters for removal from the changeable letterboard, and mechanically releasing the letters, depositing them elsewhere for such purposes as storage or sorting. Still further objects and advantages will become apparent from a consideration of the ensuing description and drawings.

Figure 1:
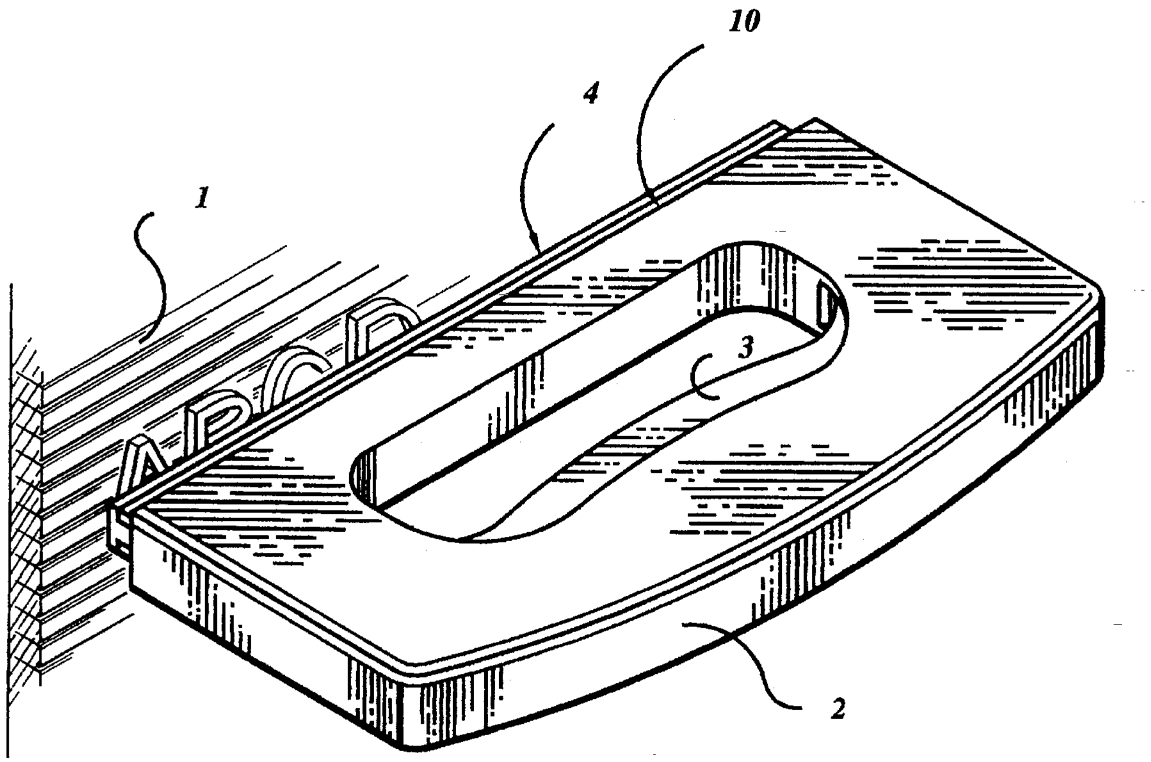
FIG. 1 is a perspective view of the letter mover, as shown in position, against letters and a changeable letterboard, which are not part of the claims.

Reference Numerals in Drawings 1. Changeable letterboard and letters (Not part of claims)

2. Case

3. Slide

4. Adhesive

5. Spring

6. Spring guide

7. Adhesive groove

8. Guide post

9. Guide slot

10. Stripper face

DESCRIPTION OF THE PREFERRED EMBODIMENT

A typical embodiment of the letter mover of the present invention is illustrated in FIG. 1. The letter mover is shown with an adhesive face 4 placed against a group of letters 1 of a changeable letterboard 1, neither the changeable letterboard 1 nor the letters 1 are part of the claims. A slide 3 and the back of a case 2 combine along with the obvious hole in the center of the letter mover to form a gripping area for a hand. A stripper face 10, an integral part of the front of the case 2, is shown in a neutral position behind the adhesive face 4.

Figure 2:
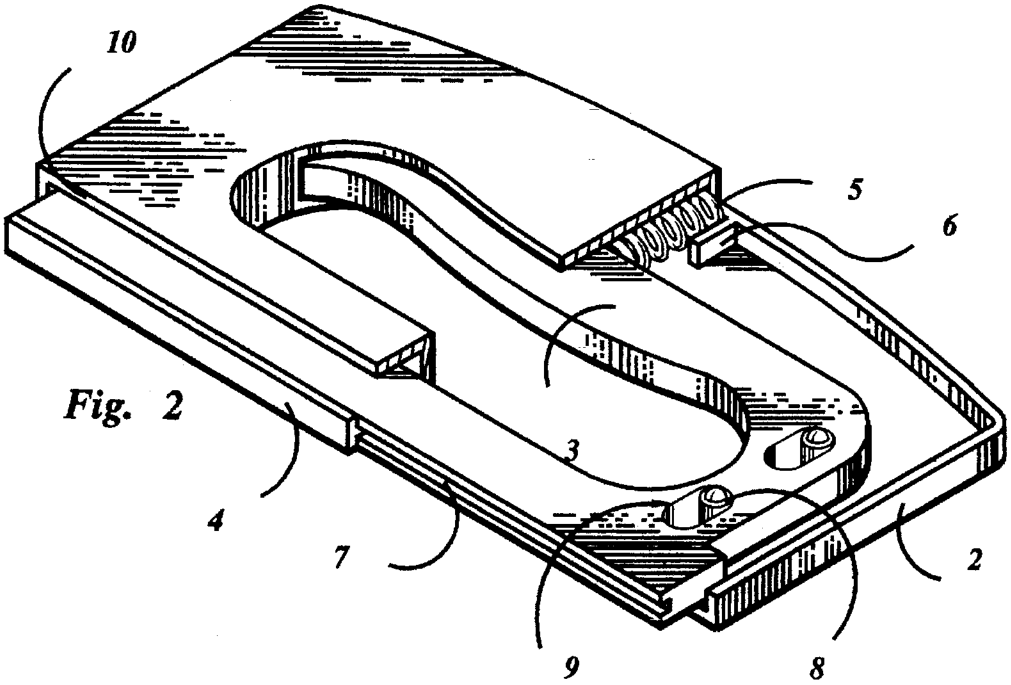
FIG. 2 is a perspective view of the letter mover in a broken out section to expose the internal features of the device.
Figure 3:
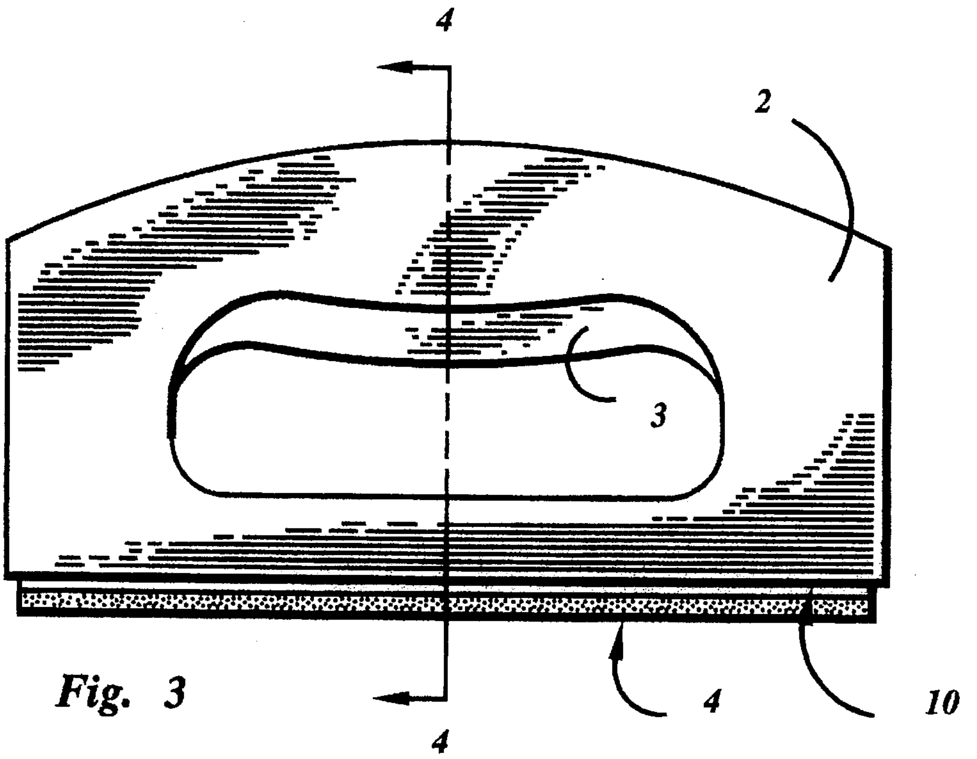
FIG. 3 is a top view of the letter mover with an indication of cutting-plane line 4—4.

FIG. 2 shows a perspective view of the letter mover with a broken-out section to expose the internal features of the device. An outer case 2 is comprised of an assembly of two symmetrical halves forming a hollow, flat device. The case 2 has appropriate openings for hand gripping and to accommodate the exposure of portions of a principally internal slide 3. The outer case 2 contains internal guide posts 8 and a spring guide 6 an integral part of the case 2. A stripper face 10 is formed by the entire front face of the outer case 2. Also shown is a principally internal slide 3, mating slidably close within the case 2, with guide slots 9 cooperating with the internal guide posts 8 to maintain alignment and allow for the retraction of the internal slide 3 into the outer case 2 upon hand compression of an internal spring 5. The slide 3 has an exposed front face with a grove 7, both face and groove to accommodate an adhesive 4, and a hole aligned with the hole in the outer case 2 for hand gripping and compression of the spring 5. The internal spring 5 is seated in a spring guide 6. The spring 5 is under compression between the case 2 and the slide 3 keeping the relationship between the case 2 and the slide 3 in a normally extended position. A partial strip of tacky, malleable, self-renewing adhesive 4 is shown in FIG. 2.

Figure 4:
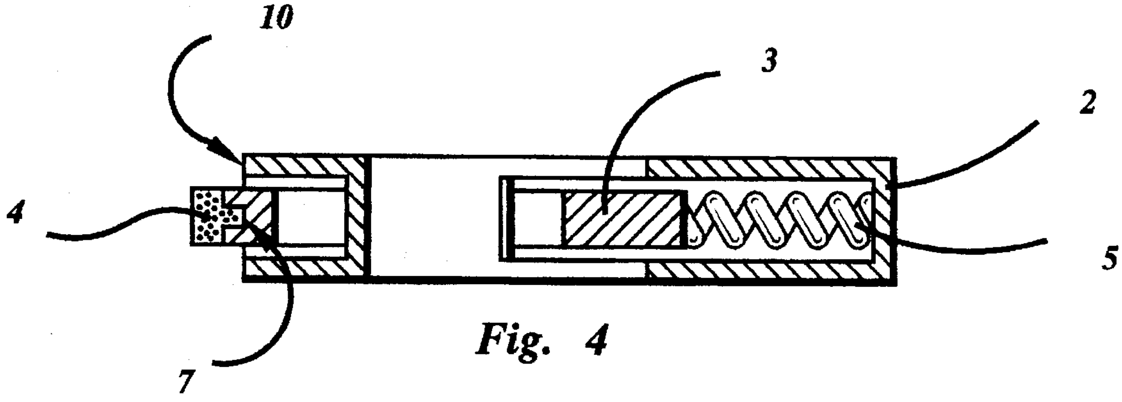
FIG. 4 is a sectional view 4—4 taken from the position indicated in FIG. 3.

In FIG. 4, sectional view 4—4 is indicated. The slide 3 is shown in the normal forward position in relationship to the external case 2 with the adhesive 4 and front portion of the slide exposed and forward of the stripper face 10. The adhesive 4 is adhesively seated to the front face of the slide 3 and into the adhesive groove 7. The spring 5 is shown extended, maintaining pressure between the case 2 and the slide 3.

Figure 5:
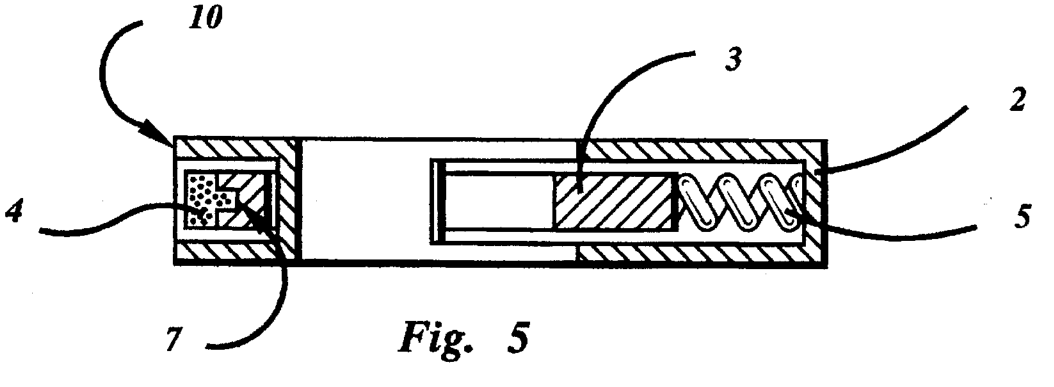
FIG. 5 is a sectional view 4—4 with internal parts of the device withdrawn into an alternate position.

In FIG. 5, sectional view 4—4 is indicated similar to FIG. 4 with the exception that the front of slide 3 is shown in the alternate position, withdrawn into the case 2. Note the adhesive 4 is withdrawn beyond the stripper face 10 so as to facilitate stripping the letters 1 from the adhesive 4. The spring 5 is shown in a compressed form maintaining pressure between the slide 3 and the case 2.

With continuing reference to the accompanying drawings wherein like reference numerals designate similar parts throughout the various views, a description of the manner of using the letter mover follows.

In FIG. 1, the letter mover device of the present invention is hand pressed against the letters 1 of a changeable letterboard 1 with the exposed tacky, malleable adhesive 4, attached to the front face of the slide 3, adhesively contacting the letters 1. While hand pressing the letter mover device against the letters 1, as above, the slide 3 is maintained in a normally extended position in relation to the outer case 2 by spring 5 compressed between the case 2 and the slide 3. When the letter mover device is withdrawn from the changeable letterboard 1, adhesive force between the letters 1 and the adhesive 4 will allow the letters 1 to be pulled away from the changeable letterboard 1. Adhesive force between the letters 1 and the adhesive 4 will maintain the attached letters 1 in relative position to each other. A portion of the slide 3 and the back of the case 2 combine along with the obvious hole in the center of the letter mover to form a gripping area for a hand. If the slide 3 and the case 2 are squeezed in the gripping area described above, the adhesive 4 attached to the slide 3 will be withdrawn into the case 2 to a point beyond the stripper face 10. When the adhesive 4 is withdrawn into the case 2, letters 1 attached to the adhesive 4 will be stripped away from the adhesive 4 by the stripper face 10. If the letters 1 attached to the adhesive 4 as above, are pushed into position on the changeable letterboard 1 previous to the time they are stripped by the stripper face 10, they will remain in their original relative position to each other. The letters 1 mentioned above do not have to be deposited on the changeable letterboard 1, the letters 1 may be stripped from the adhesive 4 by the stripper face 10 for deposit elsewhere. The close mating of the slide 3 and the case 2 along with mutual forward and rearward contact points respectively guide and limit the forward and rearward travel of the principally internal slide 3 in the outer case 2. Guide slots 9 located in the slide 3, cooperating with the internal guide posts 8 attached to case 2, maintain alignment between the case 2 and the slide 3 at the same time limiting the travel of slide 3 in case 2. The guide posts 8 also act as spacers and gluing surfaces in the assembly of the two symmetrical halves of the external case 2. When the principally internal slide 3 and the external case 2 are gripped and squeezed in the aforementioned gripping area, the slide 3 is retracted into the case 2, the spring 5 is compressed, retaining force to return the slide 3 to the normally extended position when gripping pressure is released.

From the foregoing, the letter mover for moving letters on a changeable letterboard will be readily understood and further explanation is believed to be unnecessary. However, since numerous modifications and changes will readily occur to those skilled in the art, it is not desired to limit the invention to the exact constructions shown and described. For example changes could be made in the size, shape, position of use, material, color, or integral or modular construction, and accordingly, further modifications and equivalents may be resorted to, as encompassed by the scope of the appended claims.

What I claim is:

1. A device to move letters on a changeable letterboard by adhesively gripping and mechanically stripping said letters, said device comprising:

an outer case, with a front stripper face, and appropriate openings to accommodate the exposure of portions of a principally internal slide, said slide having an exposed front face, and a hole aligned with one of said openings in said case for hand gripping and compression of a spring to effect retraction of said slide into said case, said slide cooperating slidably close with said case to maintain alignment, said spring to maintain the relationship between said case and said slide in a normally extended position, and a tacky adhesive applied to said exposed front face of said slide;

whereby said device will facilitate movement of said letters by adhesively gripping and mechanically stripping letters to be moved on said changeable letterboard.

2. The device of claim 1, further including in said outer case, an internal spring guide.

3. The device of claim 2, further including, guide slots of said principally internal slide, cooperating with, guide posts in the said outer case to maintain alignment and allow for retraction of said internal slide into said outer case.

4. The device of claim 3, wherein said tacky adhesive is malleable and self-renewing.

5. A device to remove and replace a group of letters from a changeable letterboard, keeping them in relative position to each other by means of a tacky, malleable, self-renewing adhesive comprising:

an outer case with internal guide posts, spring guide, front stripper face, and appropriate openings for hand gripping and to accommodate the exposure of portions of an internal slide;

a principally internal slide with guide slots cooperating with the internal guide posts to maintain alignment and allow for retraction of the internal slide into the outer case upon hand compression of an internal spring, a front face with a groove exposed to accommodate tacky, malleable, self-renewing adhesive, and a hole aligned with the hole in the outer case for hand gripping and compression of the spring to effect retraction of the internal slide;

an internal spring to maintain the relationship between the case and the slide in a normally extended position;

and a tacky, malleable, self-renewing adhesive applied to the front exposed portion of the slide and affixed by adhesive action to the front face and groove of the slide.

6. A method of removing and replacing a group of letters on a changeable letterboard, keeping said letters in relative position to each other, said method comprising steps of:

gripping said letters using a tacky adhesive gripping means, moving said letters in combination with said gripping means to a new location on said changeable letterboard, pressing said letters onto said letterboard using said gripping means, and, using a stripping means, stripping said letters from said tacky adhesive, whereby said letters are left on said changeable letterboard, said letters maintaining original relative position to each other;

wherein said tacky adhesive gripping means and said stripping means combine in a unit comprising, an outer case with internal guide posts, spring guide, front stripper face, and appropriate openings for hand gripping and to accommodate the exposure of portions of an internal slide, a principally internal slide with guide slots cooperating with the internal guide posts to maintain alignment and allow for retraction of the internal slide into the outer case upon hand compression of an internal spring, a front face with a groove exposed to accommodate tacky, malleable, self-renewing adhesive, and a hole aligned with the hole in the outer case for hand gripping and compression of the spring to effect retraction of the internal slide, an internal spring to maintain the relationship between the case and the slide in a normally extended position, and a tacky, malleable, self-renewing adhesive applied to the front exposed portion of the slide and affixed by adhesive action to the front face and groove of the slide.

* * * * *